March 14, 1933. C. W. CHAMBERLAIN 1,901,632

INTERFEROMETER

Filed Sept. 5, 1929

A

B

Inventor.
Clark W. Chamberlain
By
Fay Oberlin & Fay
Attorneys

Patented Mar. 14, 1933

1,901,632

UNITED STATES PATENT OFFICE

CLARK W. CHAMBERLAIN, OF EAST LANSING, MICHIGAN

INTERFEROMETER

Application filed September 5, 1929. Serial No. 390,552.

The present invention relates to the making of precision measurements by the use of light waves which have been caused to interfere in a new manner.

The principal object of my invention is to produce a type of interference of light waves different from and more suitable for use in precision measurement than "Fizeau Interference Fringes" or "Fabry and Perot Interference Fringes", now in use.

Another object of my invention is to form and use in precision measurements a type of interference fringe which will produce a visual record of the distance measured.

Another object of my invention is to employ white light, of greater intensity and more conveniently produced than monochromatic light now used in precision measurements.

Another object of my invention is the production of a precision instrument which will employ interference of light waves in the measurements of lengths in convenient decimal parts of an inch or centimeter.

A further principal object of my invention is the production of an instrument of precision with which magnitudes can be accurately and quickly compared with gauges or standards.

Another object of my invention is the production of a precision instrument with which magnitudes can be determined accurately and quickly in absolute terms without reference to any fixed standard.

More specifically my invention relates to the design of an interferometer which will produce interference fringes in white light, and record a linear movement by means of an increase in the number of interference fringes in a fixed field of view, and enable an unskilled operator to make measurements quickly and accurately. Other objects and advantages will appear as the description proceeds.

To the accomplishment of the foregoing and related ends, said invention, then, consists of the features hereinafter fully described and particularly pointed out in the claims, the annexed drawing and the following description setting forth in detail certain means and mode of carrying out the invention, such disclosed means and mode illustrating, however, but one of the various ways in which the principle of the invention may be used.

Figure 1:
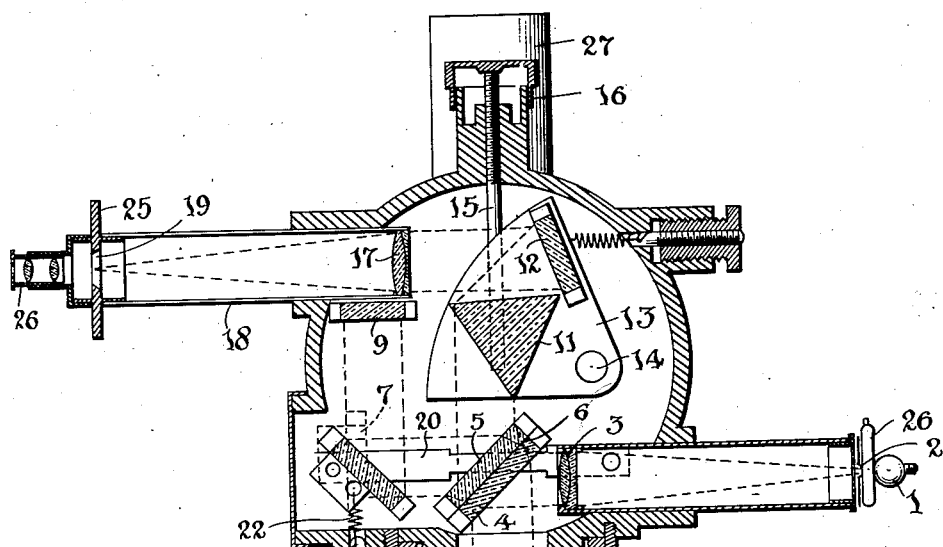
Figure 2:
Figure 3:

In the annexed drawing:

Fig. 1 is a vertical sectional view illustrating one embodiment of the invention as applied to measuring standards and gauges in absolute terms and comparing finished parts with standards or gauges; and Figs. 2 and 3 are views of interference bands as observed with the instrument.

White light from a small incandescent lamp 1 falls on a horizontal slit 2, placed in the principal focus of the lens 3. The collimated beam of light falls upon matched plane parallel plates 4 and 5. These plates are cut from the same plane parallel plate, and are optically matched. The inner surface of one of these plates is covered with a metallic film 6, of such thickness as to transmit half and reflect half of the incident light. The plates are sealed together with Canada balsam, gum damar, or other transparent material of approximately the same index of refraction as the plates.

The transmitted ray falls perpendicularly on the mirror 7, (shown in dotted line vertical position) or is incident at an angle of forty-five degrees on the mirror rotated through forty-five degrees into the position 7', and then incident perpendicularly on mirror 9. Mirrors 7 and 9 are silvered on their front surfaces. The transmitted ray is returned on its path to the thin film and again divided. The reflected portion of this transmitted ray passes through the prism 11, and is hereafter called the transmitted reflected ray.

The reflected ray is incident perpendicularly on the plate 10 which is silvered on its upper surface, is returned on its path and again divided by the film 6. The transmitted portion passes through the prism 11 and is hereafter called the reflected transmitted ray.

The transmitted reflected and reflected transmitted rays now travel parallel paths with a phase relationship depending on the difference in length of the paths traveled.

After passing through the prism the two rays are reflected from the mirror 12 silvered on its front face. The prism 11 and mirror 12 are mounted on a support 13 which is swung about the axis 14 by the screw 15. The axis 14 is at the intersection of the plane of the mirror surface 12, extended, and the plane bisecting the refracting angle of the prism 11. A constant deviation prism may be substituted for the prism 11 and mirror 12, mounted in the manner described above. The adjusting head 16 of the screw 15 may be calibrated to read direct in wave lengths of light.

The transmitted reflected and reflected transmitted rays next pass through the objective lens 17 of the telescope 18, which is focused at infinity. In the focal plane 19 are formed images of the slit 2, which is at an infinite distance, optically, from the observer. When the interfering rays travel optically equal paths, a continuous spectrum is observed.

The mirror 7 is mounted on a torsion arm 20, moved in a vertical plane by the differential screw 21 and spring 22, and in a horizontal plane by a similar screw, not shown. These screws enable the operator to bring the interfering rays into exact coincidence; the white light spectrum will then be crossed by horizontal black bands, the number depending on the difference in length of path of the interfering rays.

The plunger —10—, mounted in a cell —23—, is movable vertically along the cylindrical ways —24—: such vertical movement causing the number of dark interference bands in the field of view to change; as from A to B in Figs. 2 and 3 of the drawing.

The field of view in the focal plane —19— of the telescope —18— is determined by the stops —25— or by bright lines in a discontinuous spectrum furnished by the eye-piece —26—, which also serves as a cylindrical lens for focusing the filament of the lamp —1— on the slit —2—. If this field of view is one octave in length: i. e. the longest wave length visible being twice the length of the shortest wave visible, a movement of the reflecting surface —10— equal to one half a wave length of the longest wave will increase or reduce the number of dark bands in the field of view by one. This field of view may expose or limit such a portion of the spectrum that the loss or addition of one dark band records a movement of the reflecting surface —10— corresponding to an even decimal of an inch or centimeter. By decreasing the range of spectrum exposed or employed in the field of view and increasing the magnifying power of the eye-piece —26— the sensitiveness of the instrument may be decreased at will and thus adapted to various needs.

The entire optical system described above, with its supporting and enclosing case is movable vertically along the column —27— by a rack and pinion or other device, not shown.

Near the base of the column —27— is a plate —28— of glass, quartz, metal, or other material, with leveling screws —29— and mechanism for slow-motion in a vertical direction —30—.

The upper surface of the plate —28— is brought into parallelism with the reflecting surface —10— by observing interference fringes through a small window in the reflecting film on the upper surface of the reflecting surface —10—. The gauge or block to be employed is placed between the reflecting surface —10— and the plate —28—, and any convenient number of interference bands set up in the field of view by means of the slow motion mechanism —30—. The object to be measured is then substituted for the standard; the difference in length being recorded by a change in the number of interference bands seen in the field of view.

There are many known methods of producing interference bands which may be divided into two general types, known as Fizeau bands and Haidinger bands, and are sometimes described as interference bands of equal thickness and bands of equal inclination. They have several characteristics in common; they are produced by light from a single source, divided into two parts, led over different paths, and reunited at a small angle. When one of the optical paths is changed in length the interference bands move across the field of view. The distance between consecutive bands corresponds to a linear movement of one half a wave of light or a change in optical path of one light wave. Only one band can be identified and that in white light, when the interfering paths are equal. In making measurements it is necessary, therefore, to laboriously count the interfering bands as they move across the field of view. The number of bands to be counted may amount to several thousand. A slight disturbance of the apparatus by traffic jars may cause several bands to move across the field and render the count inaccurate.

Fabry and Perot interference bands may be considered a refined type of circular Haidinger bands and subject to many of the latter's limitations.

The recording interference bands, as provided by the apparatus and method comprising my invention, are produced as follows:—

Referring to Fig. 1, when the slit 2 is illuminated with monochromatic light, an image of the slit in that color is formed in the focal plane 19, when the interfering optical paths are equal. A movement of the reflecting surface 10 introduces a change in the length of one optical path. When this change in optical path is equal to an odd number of half wave lengths the two beams of light destructively interfere and the image at 19 disappears. A continuous movement of the reflecting surface 10 causes a succession of eclipses of the image of the slit 2 formed at 19. Successive eclipses correspond to a movement of the reflecting surface 10 of one wave of light.

When the slit 2 is illuminated with monochromatic light of another wave length a second image of the slit 2 is formed in the focal plane 19, above or below the image previously described, according as the second wave length is longer or shorter than the first, due to the dispersing element 11. If the slit 2 is illuminated simultaneously by light of two wave lengths the separate images in the focal plane 19 will be eclipsed at different intervals during the movement of the reflecting surface 10.

When the optical paths are equal and the slit 2 is illuminated with white light, a continuous spectrum is formed in the focal plane 19. Assume the movable masks 25 adjusted in such manner as to expose only one octave of the continuous spectrum. If the reflecting surface 10 is moved one-quarter of the length of a blue light wave the optical path is changed one-half the length of a blue light wave. The whole optical system of the apparatus is now opaque to blue light which is thrown back on the slit, and a black line appears in the blue end of the spectrum. When the reflecting surface 10 is moved one-quarter of a red wave length the optical system of the instrument is opaque to white light and a black line appears in the red end of the spectrum. A continuous movement of the reflecting surface 10 in one direction for a distance corresponding to the difference in length of a quarter of a blue light wave and a quarter of a red light wave causes the black band to move continuously from the blue end of the spectrum to the red end of the spectrum. When one octave of the spectrum is exposed to view and the first dark band has moved to the red end of the spectrum, as above explained, a second dark band appears in the blue end. As a red wave of light is twice the length of a blue wave of light, twice as many black bands originate in the blue end of the spectrum as originate in the red end. When the reflecting surface 10 moves such a distance as to cause five black bands to move out the red end of the spectrum 10 black bands move into the blue end of the spectrum, leaving five bands in the field, thus recording in the field of view the movement of the reflecting surface 10 in terms of the length of red light waves.

The red wave of light has been made the international standard of length. It is not an even decimal part of an inch or centimeter. It is readily understood that the masks 25 may be adjusted so as to expose to the field of view such a portion of the continuous spectrum that a change of one dark band in the field of view will correspond to a movement of the reflecting surface 10 equal to an even decimal of an inch or centimeter.

The recording interference bands as produced by practicing the present invention differ from interference bands previously known and used. Interference bands of equal thickness or of equal inclination are loci of points of equal thickness or of equal inclination on corresponding wave fronts of the two interfering beams. A slight change in the angle between the interfering beams causes interference bands, of equal thickness or of equal inclination, to orient. Such bands shift their position with a movement of the eye of the observer. Recording interference bands are images of the slit 2. A slight change in the angle between the interfering beams produces no change in the orientation of recording bands but only changes their intensity, as recording interference bands are real images of the slit 2, their position remains fixed in the focal plane 19.

With the masks 25 set so as to expose a portion of the spectrum of such a length that the change in the number of recording interference bands corresponds to a movement of the reflecting surface 10 of any desired even decimal of an inch or centimeter, the instrument and the method comprising my invention may be used to compare the unknown length of a given object with the known length of a standard object in terms of an even decimal of an inch or centimeter. With the known standard placed between the fixed anvil 28 and the plunger bearing the reflecting surface 10, the instrument is set by raising or lowering the anvil 28 by means of the screw 30 so as to expose any desired number of dark bands in the field of view as shown in Fig. 2. As the plunger is raised and lowered to remove the fixed standard and insert the object of unknown length, recording interference bands increase and then decrease in number recording at any instant the amount of movement of the plunger from its position when resting on the standard. When the plunger rests upon the object of unknown length the difference in the number of recording bands as shown in Fig. 3 and the number shown in Fig. 2 records the difference in length between the known standard and the object whose length is being measured in terms of an even decimal of an inch or centimeter.

Standard gauges and other objects can be measured in wave lengths of light by Koester's method without reference to any other standard by employing the source —1—, removing the plunger —10— and its cell —23—, and the eye-piece —26—. A slight movement of the screw —21— will throw the interfering rays out of coincidence and cause them to cross at a small angle thus producing the ordinary Fizeau interference fringes on the retina of the eye placed at the opening of the eye-piece tube. By observing the Fizeau fringes formed by the plate —7— and the upper face of the gauge block the length of the gauge block may be determined in absolute units. By rotating the mirror —7— forty-five degrees into the position —7'—, thus reflecting the transmitted ray to the mirror —9—, the optical path of the transmitted reflected ray may be increased so as to make it possible to measure conveniently in wave lengths of light gauges of considerable length.

Other modes of applying the principles of my invention may be employed instead of the one explained, change being made as regards the means and the steps herein disclosed, provided those stated by any of the following claims or their equivalent be employed.

I therefore particularly point out and distinctly claim as my invention:—

1. The method of optically measuring lengths which comprises the steps of separating a beam of white light into two interfering beams, which are ultimately reunited to form a continuous spectrum having dark bands in various numbers in definite relationship to the differences in length of the paths of such interfering beams, and adjusting the relative lengths of the paths of such interfering beams in relation to the length being measured, whereby the number of bands appearing in the spectrum indicate the length being measured.

2. The method of comparing dimensions of an object of unknown dimensions with those of known dimensions, which comprises the steps of separating a beam of white light into two interfering beams which are ultimately reunited to form a continuous spectrum having dark bands in various numbers in definite relationship to the differences in length of the paths of such interfering beams, and then at separate times adjusting the relative lengths of the paths of such interfering beams in relation to corresponding dimensions of the object being compared, whereby the relative number of dark bands appearing in the spectrum during such separate adjustments indicate the dimension of one object with respect to the other.

3. The method of optically measuring lengths which comprises the steps of separating a beam of white light into two interfering beams, which are ultimately reunited to form a continuous spectrum having dark bands in various numbers in definite relationship to the differences in length of the paths of such interfering beams, and adjusting the relative lengths of the paths of such interfering beams in relation to the length being measured, whereby the number of bands appearing in the spectrum indicate the length being measured, and delimiting the portion of the spectrum appearing in the field of view to such an extent as to vary the number of dark bands which will appear in the delimited portion of the spectrum for a given difference in length between the two interfering light paths.

4. The method of producing dark interference bands in a continuous spectrum, the steps which consist in passing a beam of white light through an aperture, collimating such beam, dividing such beam into two separate parts, leading such separated parts of the beam over separate paths of relatively adjustable lengths, reuniting such separated parts in strict parallel relationship, dispersing the light of such reunited parts, and focusing the dispersed light into a continuous spectrum.

5. The method of producing dark interference bands in a continuous spectrum, the steps which consist in passing a beam of white light through an aperture, collimating such beam, dividing such beam into two separate parts, leading such separated parts of the beam over separate paths of relatively adjustable lengths, reuniting such separated parts in strict parallel relationship, dispersing the light of such reunited parts, focusing the dispersed light into a continuous spectrum, and changing the relative lengths of said separate paths to change the number of dark bands in said spectrum.

6. The method of producing dark interference bands in a continuous spectrum, the steps which consist in passing a beam of white light through an aperture, collimating such beam, dividing such beam into two separate parts, leading such separated parts of the beam over separate paths of relatively adjustable lengths, reuniting such separated parts in strict parallel relationship, dispersing the light of such reunited parts, focusing the dispersed light into a continuous spectrum, changing the relative lengths of said separate paths to change the number of dark bands in said spectrum, and delimiting the portion of the spectrum appearing in the field of view to such an extent that a change in the relative lengths of said separate paths in even decimals of a unit of length produces a change of a whole number of dark bands in such delimited field.

7. In apparatus for producing dark interference bands in a continuous spectrum, the combination of an aperture illuminated with white light, means for collimating the beam passing through such aperture, means for dividing such collimated beam into two parts, and subsequently reuniting the same in strictly parallel relationship, means for leading the separated parts over separate paths of relatively adjustable lengths, before they are reunited, means for dispersing the light of the reunited beams, and means for focusing the dispersed light into a continuous spectrum.

8. In apparatus for producing dark interference bands in a continuous spectrum, the combination of an aperture illuminated with white light, means for collimating the beam passing through such aperture, means for dividing such collimated beam into two parts, and subsequently reuniting the same in strictly parallel relationship, means for leading the separated parts over separate paths of relatively adjustable lengths before they are reunited, means for dispersing the light of the reunited beams, means for focusing the dispersed light into a continuous spectrum, and means for delimiting the portion of the spectrum in the field of view.

9. A method of the character described, which comprises providing interfering light rays and refracting such rays, with interference suppression of certain wave lengths in the spectrum, superposing thereon in the same visual field a reflected image of an article to be measured, and gauging the over-all dimension of said article against the interference field background.

10. A method of the character described, which comprises delimiting a portion of a spectrum while producing therein dark interference bands by interfering light beams having different lengths of path, and selectively changing the length of path of one of the interfering beams in calibrated terms of an exact fractional part of a standard unit of length, while associating an object to be measured in the same visual field.

11. A method of the character described, which comprises controlling the rate of sensitiveness in measurement by combining beams of light in phase displacement, delimiting a portion of a resultant spectrum having dark interference bands, changing the length of path of one of the interfering beams, and correlating the change in the number of interference bands, appearing in the delimited portion of the spectrum while associating an object to be measured in the same visual field.

12. In apparatus of the character described, a source of light, an illuminated slit, a collimating lens, means for dividing the light into two beams, means for leading the beams over different paths, means for uniting the beams, a spectrum-forming system, means for focusing the light rays, a magnifying eyepiece, and a support for an article to be measured, removed from the means for dividing the light into beams.

13. In apparatus of the character described, means for delimiting a portion of spectrum in which dark interference bands are produced, means for decreasing the scale of sensitiveness, said means including mechanism for changing the length of path of one of two interfering beams of light, means for correlating the change in number of interference bands in the delimited portion of spectrum and means for correlating an object to be measured with such portion of spectrum.

Signed by me this 30th day of July, 1929.
CLARK W. CHAMBERLAIN.